US011216897B2

(12) United States Patent
Vidhani et al.

(10) Patent No.: US 11,216,897 B2
(45) Date of Patent: Jan. 4, 2022

(54) METHOD AND SYSTEM FOR CONTRACT MANAGEMENT IN A DATA MARKETPLACE

(71) Applicant: Tata Consultancy Services Limited, Mumbai (IN)

(72) Inventors: Kumar Mansukhlal Vidhani, Pune (IN); Vijayarangan Natarajan, Chennai (IN); Sachin Premsukh Lodha, Pune (IN); Kishore Padmanabhan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 781 days.

(21) Appl. No.: 16/078,854

(22) PCT Filed: Feb. 22, 2017

(86) PCT No.: PCT/IB2017/051001
§ 371 (c)(1),
(2) Date: Aug. 22, 2018

(87) PCT Pub. No.: WO2017/145063
PCT Pub. Date: Aug. 31, 2017

(65) Prior Publication Data
US 2021/0182990 A1    Jun. 17, 2021

(30) Foreign Application Priority Data
Feb. 22, 2016   (IN) .............................. 201621006132

(51) Int. Cl.
*G06F 17/00*       (2019.01)
*G06Q 50/18*      (2012.01)
*G06F 16/28*      (2019.01)

(52) U.S. Cl.
CPC ........... *G06Q 50/18* (2013.01); *G06F 16/285* (2019.01)

(58) Field of Classification Search
None
See application file for complete search history.

(56) References Cited

U.S. PATENT DOCUMENTS 5,708,825 A * 1/1998 Sotomayor ........... G06F 40/134
                                                        715/205
7,702,563 B2    4/2010 Balson et al.
(Continued)

OTHER PUBLICATIONS

International Search Report dated Jun. 21, 2017, in corresponding International Application No. PCT/IB2017/051001; 2 pages.
(Continued)

*Primary Examiner* — Mustafa A Amin
(74) *Attorney, Agent, or Firm* — Finnegan, Henderson, Farabow, Garrett & Dunner LLP

(57) ABSTRACT

System and method for contract management in a data marketplace are disclosed. In an embodiment, the system performs refactoring of a contract, during which the system extracts terms and conditions from the contract and generates a simplified view of the contract. The system further performs a requirement validation based on the contract, during which the system determines features of data entity matches requirements specified by a first party or not, based on domain specific ontologies. If the data entity features are not matching with the requirements, then the system fetches one or more relevant attributes from a list of ontologies, verifies whether the features of entity along with the selected feature(s) satisfy the requirements or not. The system accordingly generates an agreeable requirement document as output of the requirement validation.

7 Claims, 7 Drawing Sheets

(56) References Cited

U.S. PATENT DOCUMENTS

| | | | |
|---|---|---|---|
| 9,465,801 B2 | 10/2016 | Tripathi et al. | |
| 2002/0010686 A1* | 1/2002 | Whitesage | G06Q 30/0202 |
| | | | 705/80 |
| 2004/0085355 A1 | 5/2004 | Harmes et al. | |
| 2009/0083621 A1* | 3/2009 | Kermani | G06F 16/345 |
| | | | 715/256 |
| 2009/0281853 A1* | 11/2009 | Misvaer | G06Q 10/06 |
| | | | 705/311 |
| 2010/0106653 A1 | 4/2010 | Sandholm et al. | |
| 2012/0117467 A1 | 5/2012 | Maloney et al. | |
| 2013/0246326 A1 | 9/2013 | Graupner et al. | |
| 2015/0213465 A1 | 7/2015 | Noyes et al. | |
| 2015/0278745 A1 | 10/2015 | Sharma et al. | |
| 2017/0011313 A1 | 1/2017 | Pochert et al. | |

OTHER PUBLICATIONS

Written Opinion dated Jun. 21, 2017, in corresponding International Application No. PCT/IB2017/051001; 5 pages.

* cited by examiner

METHOD AND SYSTEM FOR CONTRACT MANAGEMENT IN A DATA MARKETPLACE

CROSS-REFERENCE TO RELATED APPLICATIONS AND PRIORITY

The present application is a U.S. National Stage Filing under 35 U.S.C § 371 and claims priority from International Application No. PCT/IB2017/051001, filed on Feb. 21, 2017, which claims priority under 35 U.S.C. § 119 to Indian Patent Application No. 201621006132, filed on Feb. 22, 2016. The entirety of each are incorporated herein by reference.

TECHNICAL FIELD

The disclosure herein generally relate to contract management, and, more particularly, to contract management in a data marketplace.

BACKGROUND

Nowadays, a huge amount of data is generated by multiple sources and can be put to multiple uses. To facilitate easy interchange and monetization of data, the concept of a data marketplace is getting very popular day by day. The data marketplace is an online platform where users may buy, sell, trade, and/or otherwise transact personal data with other users for agreed upon compensation and other predefined terms and condition. The compensation and the other predefined terms and conditions are normally covered in a contract.

A contract states the terms and conditions of a legally-binding agreement between two parties. The contract includes the parties' rights and obligations, and comprises clauses to be fulfilled (e.g. agreeing to supply a certain quantity of goods by a given date). The contract also includes penalty clauses stating a penalty that would be incurred by the party, should there be breach of the contract and the party not fulfilling the terms and condition of the contract. There could be multiple contracts involved between two or more parties. The effective management of contracts is very important in the data marketplace.

Contract management includes, but is not limited to, identifying the actions required by parties to the contract, identifying due dates, ensuring data privacy, choosing pricing discovery method, providing timely notifications to responsible parties and apprising them of appropriate actions to be performed, and so on. Further, most contracts are related to one another and an action performed on one obligation may trigger related obligations, requiring a set of inter-related events to be performed. As a result, it is important to understand each obligation and its corresponding relationships.

The management of contracts has largely been a manual task where the efficiency of the contract management system is largely dependent upon the skill of a person who is managing contracts (contract manager). Further, as contracts may include legal terminologies, a person having less or no legal knowledge may find it difficult to understand terms, conditions, obligations and so on defined in a contract. Additionally, no solution exists that can help manage relationships between contracts, ensuring complete conformity.

Further, in a data marketplace, a buyer and a seller would get involved in discussions to finalize a contract. Such discussions, which are more of negotiations, are to make sure that the buyer's requirements and the seller's product features match. Existing contract management systems that facilitate contract negotiation only provides platforms which helps the buyers and sellers communicate and manually perform negotiations. However, the existing contract management systems are not capable of handling contract negotiation on their own.

SUMMARY

Embodiments of the present disclosure present technological improvements as solutions to one or more of the above-mentioned technical problems recognized by the inventors in conventional systems. For example, in one embodiment, processor implemented method is provided, wherein the method comprises of obtaining, by a contract management system, a contract comprising information from at least one of a first party and a second party; receiving, by the contract management system, an input specific to the contract from a user, wherein the input comprises selection of at least one of a refactoring of the contract or a requirement validation based on the contract; performing based on the selection, by the contract management system, one of refactoring of the contract or requirement validation based on the contract, the refactoring of the contract comprises of assigning an initial score for the contract, via one or more hardware processors, by the contract management system, wherein the initial score is collected as input from a user; classifying a plurality of terms and conditions in the contract as at least one of generic and entity-specific, via the one or more hardware processors, by the contract management system; classifying the plurality of terms and conditions in the contract as at least one of legal and non-legal, via the one or more hardware processors, by the contract management system; associating the contract with at least one domain the document is identified as related to, via the one or more hardware processors, by the contract management system; establishing relationship between the plurality of terms and conditions, via the one or more hardware processors, by the contract management system; and displaying the plurality of terms and conditions along with the established relationship, via the one or more hardware processors, by the contract management system, and wherein the requirement validation based on the contract comprises of fetching a plurality of attributes pertaining to one or more entities specified in the contract by the second party, by a requirement validation module of the contract management system; identifying at least two ontologies, the attributes are related to, via one or more hardware processors, by the requirement validation module; establishing link between the at least two ontologies, via the one or more hardware processors, by the requirement validation module; checking whether the plurality of attributes satisfy a plurality of requirements specified by a first party, via the one or more hardware processors, by the requirement validation module; fetching at least one new attribute from at least one of the associated ontologies, if the plurality of attributes do not satisfy the plurality of requirements, via the one or more hardware processors, by the requirement validation module; determining whether the plurality of attributes of the one or more entities, along with the fetched at least one new attribute, match the plurality of requirements, via the one or more hardware processors, by the requirement validation module; and generating the agreeable requirement document, via the one or more hardware processors, by the requirement validation module.

In another aspect, a contract management system is provided. The contract management system comprising a hardware processor; and a storage medium comprising a plurality of instructions, the plurality of instructions causing the hardware processor to obtain, a contract comprising information from at least one of a first party and a second party; receive, an input specific to the contract from a user, wherein the input comprises selection of at least one of a refactoring of the contract or a requirement validation based on the contract; perform, based on the selection, one of refactoring of the contract or requirement validation based on the contract, the refactoring of the contract comprises of assigning an initial score for the contract, via one or more hardware processors, by the contract management system, wherein the initial score is collected as input from a user; classifying a plurality of terms and conditions in the contract as at least one of generic and entity-specific, via the one or more hardware processors, by the refactoring module; classifying the plurality of terms and conditions in the contract as at least one of legal and non-legal, via the one or more hardware processors, by the refactoring module; associating the contract with at least one domain the document is identified as related to, via the one or more hardware processors, by the refactoring module; establishing relationship between the plurality of terms and conditions, via the one or more hardware processors, by the refactoring module; and displaying the plurality of terms and conditions along with the established relationship, via the one or more hardware processors, by the refactoring module, and wherein generating the agreeable requirement document from the contract comprises of fetching a plurality of attributes pertaining to one or more entities specified in the contract by the second party, by a requirement validation module of the contract management system; identifying at least two ontologies, the attributes are related to, via one or more hardware processors, by the requirement validation module; establishing link between the at least two ontologies, via the one or more hardware processors, by the requirement validation module; checking whether the plurality of attributes satisfy a plurality of requirements specified by a first party, via the one or more hardware processors, by the requirement validation module; fetching at least one new attribute from at least one of the associated ontologies, if the plurality of attributes do not satisfy the plurality of requirements, via the one or more hardware processors, by the requirement validation module; determining whether the plurality of attributes of the one or more entities, along with the fetched at least one new attribute, match the plurality of requirements, via the one or more hardware processors, by the requirement validation module; and generating the agreeable requirement document, via the one or more hardware processors, by the requirement validation module.

In yet another aspect, a non-transitory computer readable medium embodying a program executable in a computing device for contract management is provided. The program comprising, a program code for obtaining, by a contract management system, a contract comprising information from at least one of a first party and a second party; a program code for receiving, by the contract management system, an input specific to the contract from a user, wherein the input comprises selection of at least one of a refactoring of the contract or a requirement validation based on the contract; a program code for performing based on the selection, by the contract management system, one of refactoring of the contract or requirement validation based on the contract, the refactoring of the contract comprises of assigning an initial score for the contract, via one or more hardware processors, by the contract management system, wherein the initial score is collected as input from a user; classifying a plurality of terms and conditions in the contract as at least one of generic and entity-specific, via the one or more hardware processors, by the contract management system; classifying the plurality of terms and conditions in the contract as at least one of legal and non-legal, via the one or more hardware processors, by the contract management system; associating the contract with at least one domain the document is identified as related to, via the one or more hardware processors, by the contract management system; establishing relationship between the plurality of terms and conditions, via the one or more hardware processors, by the contract management system; and displaying the plurality of terms and conditions along with the established relationship, via the one or more hardware processors, by the contract management system, and wherein the requirement validation based on the contract comprises of fetching a plurality of attributes pertaining to one or more entities specified in the contract by the second party, by a requirement validation module of the contract management system; identifying at least two ontologies, the attributes are related to, via one or more hardware processors, by the requirement validation module; establishing link between the at least two ontologies, via the one or more hardware processors, by the requirement validation module; checking whether the plurality of attributes satisfy a plurality of requirements specified by a first party, via the one or more hardware processors, by the requirement validation module; fetching at least one new attribute from at least one of the associated ontologies, if the plurality of attributes do not satisfy the plurality of requirements, via the one or more hardware processors, by the requirement validation module; determining whether the plurality of attributes of the one or more entities, along with the fetched at least one new attribute, match the plurality of requirements, via the one or more hardware processors, by the requirement validation module; and generating the agreeable requirement document, via the one or more hardware processors, by the requirement validation module.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
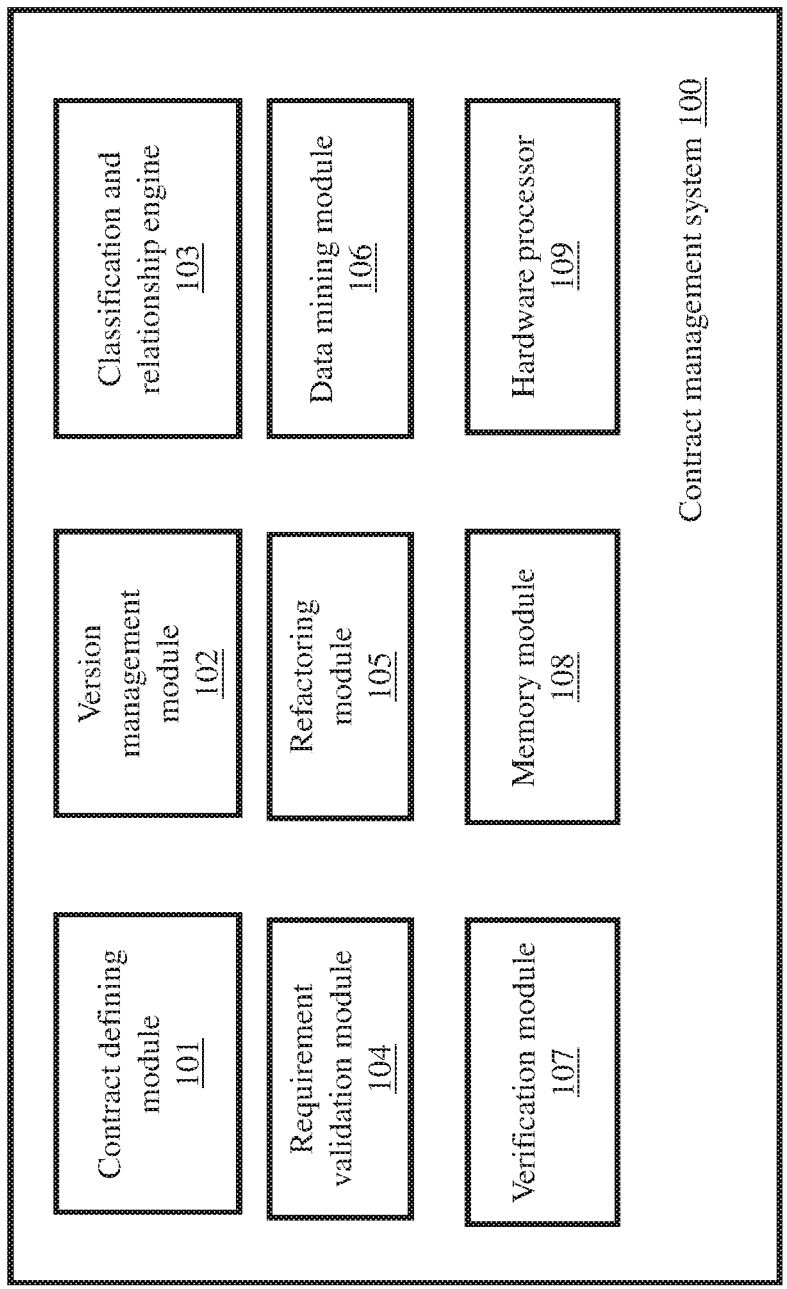
FIG. 1 illustrates an exemplary block diagram of contract management system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through 5, where similar reference characters denote corresponding features consistently throughout the figures, there are shown preferred embodiments and these embodiments are described in the context of the following exemplary system and/or method. Throughout the specification, the terms 'second party' and 'seller' are used interchangeably. Similarly, the terms 'first party' and 'buyer' are used interchangeably.

FIG. 1 illustrates an exemplary block diagram of contract management system according to some embodiments of the present disclosure. The contract management system 100 includes a contract defining module 101, a version management module 102, a classification and relationship engine 103, a requirement validation module 104, a refactoring module 105, a data mining module 106, a verification module 107, a memory module 108, and a hardware processor 109.

The contract management system 100 is primarily intended to perform refactoring of a contract and requirement validation, as part of the contract management. In addition to the aforementioned processes, the contract management system 100 handles functions such as, but not limited to defining a new contract, version management of contracts, perform classification and establishing relationship of terms and conditions in the contract, mining contracts from contract repository, and validation of terms and conditions in the contract.

While performing refactoring of the contract, the refactoring module 105 extracts terms and conditions in the contract, in light of various pre-defined criteria, identifies and establishes relationships between the extracted terms and conditions, and displays the extracted contents, along with the established relationship(s), to the user as a summarized version of the original contract, which in turn helps the user easily understand contents of the contract.

While executing the requirement validation, the requirement validation module 104 accepts one or more features of an entity being sold as listed by a second party (a seller), and one or more requirements of a first party (a buyer), as inputs. In various embodiments, the entity may be a product and/or process and/or service. By processing the collected inputs, the requirement validation module 104 determines whether the features match the requirements or not. If the features do not match the requirements, then the requirement validation module 104 fetches one or more terminologies/features from at least one associated ontology, and checks whether the features along with the fetched one or more features, meet the requirements or not. The requirement validation module 104 provides an entity suggestion to buyer, and/or provides recommendation(s) with respect to one or more changes to be made to at least one entity, so as to make features of the entity match requirements of the buyer, to the seller.

The contract defining module 101 is configured to define a contract, wherein the contract is defined from scratch or by taking and improving any existing contract. The contract defining module 101 collects terms and conditions to be included in a contract, as input. Further, by comparing the collected input, the contract defining module 101 determines whether at least one contract exists in the database, that includes identical/similar (or near similar) terms and conditions. If the contract defining module 101 is unable to find a match in the database, then a fresh template is used to define the contract from the scratch.

The version management module 102 is configured to perform versioning of the contracts. By performing the versioning of contracts, the version management module 102 helps to manage key differences among contracts. For example, if data product is sold to multiple buyers operating in different countries/jurisdiction, then versioning is required, as the contract needs to be edited to best suit requirements of each country. By performing the version management, the version management module 102 performs actions such as but not limited to tracking difference in terms and conditions, adding new terms, maintaining buyer specific contracts, and creating a new template from the existing versioned contracts. The version management module 102 can be configured to differentiate between different versions of a contract based on at least one of version numbers, naming convention, and data in a change database (not shown in FIG. 1) present in the memory module 108.

The classification and relationship engine 103 is configured to process terms and conditions from the contract, and identify and establish relationship among terms and conditions present in the contract.

The data mining module 106 is configured to mine/analyze the data to recommend the suggestions in the contract definition. The verification module 107 is configured to keep track of buyer and/or seller activities post buyer-seller transaction(s) to make sure that the buyer and/or seller is not violating the terms and condition of an associated contract(s).

The memory module 108 can be configured to store any data related to the contract management process. For instance, the memory module 108 stores ontology data pertaining to one or more domains (such as healthcare, insurance, and so on). In an embodiment, the memory module 108 allows storage of ontology pertaining to each domain. In an embodiment, different levels of hierarchy are defined for the ontologies stored in the memory module 108. The memory module 108 can be further configured to allow search and retrieval of terms from the different levels of hierarchy.

The hardware processor 109 can be configured to interact with and collect input(s) from other components of the contract management system 100, and perform one or more actions with respect to one or more functions being handled by that particular component(s). The hardware processor(s) 109 being used can be of any suitable type, and the number of hardware processor 109 in the contract management system 100 can vary as per implementation standards and requirements.

Figure 2:
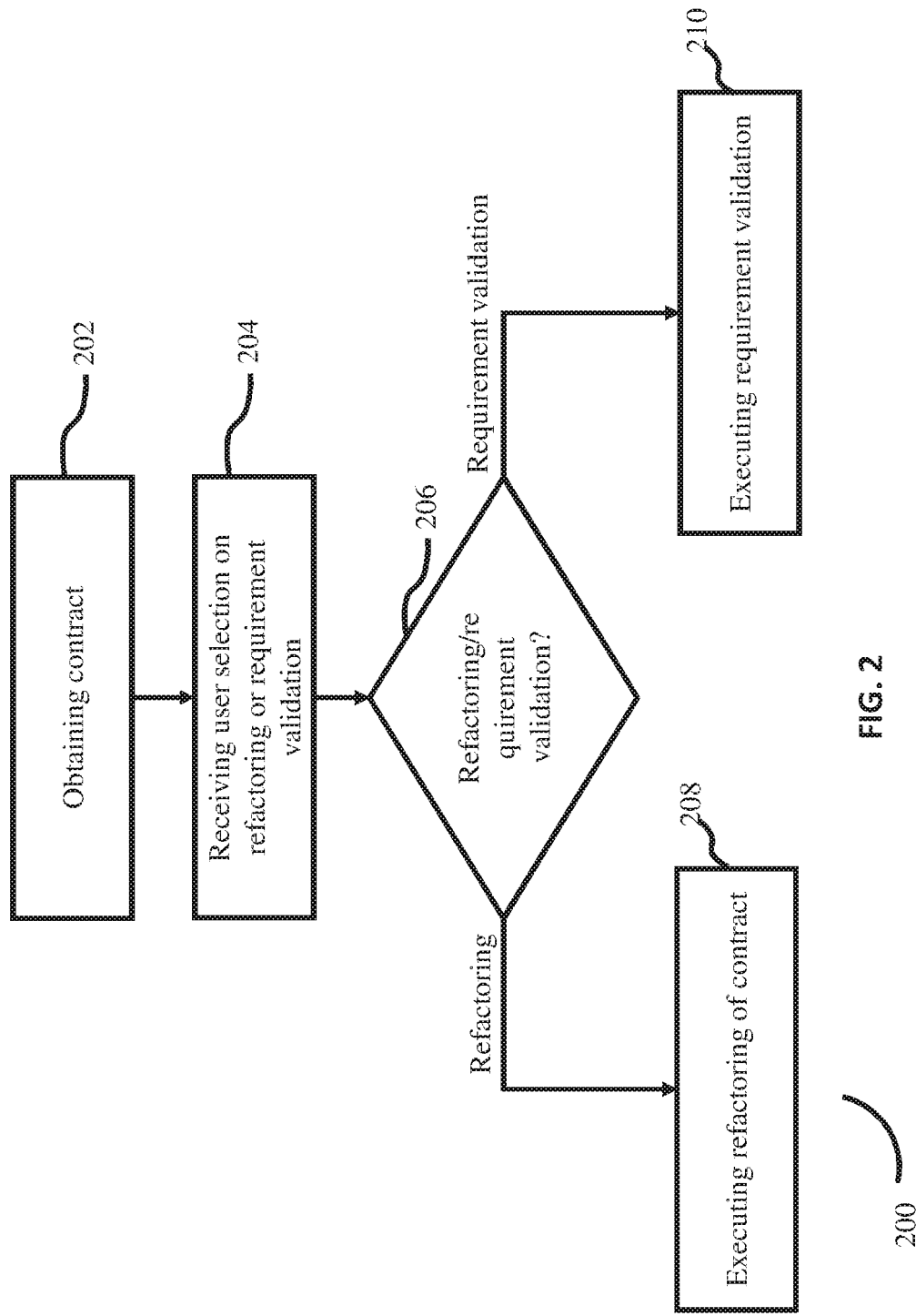
FIG. 2 is a flow diagram illustrating steps involved in the process of performing contract management, by the contract management system, according to some embodiments of the present disclosure.

FIG. 2 is a flow diagram illustrating steps involved in the process of performing contract management, by the contract management system, according to some embodiments of the present disclosure. Initially, one or more contracts is obtained (202) as input, by the contract management system 100. After obtaining the contract, the contract management system 100 receives (204) user selection on one of a refactoring of the contract or requirement validation, as input. The refactoring of the contract, upon execution, provides a simplified view of contents of the contract being processed. The requirement validation, upon execution, helps in checking whether features of one or more entities listed out by a seller match requirements specified by a buyer, and accordingly generating recommendations/suggestions.

If the user selection is of refactoring of the contract, then the contract management system 100 executes (208) refactoring of the contract, and generates corresponding output. Similarly, if the user selection is of requirement validation, then the contract management system 100 executes (210) requirement validation, and generates corresponding output. The steps in method 200 can be performed in the same order or at least one other order, as required. Further, one or more steps in FIG. 2 can be removed as per requirements.

Figure 3:
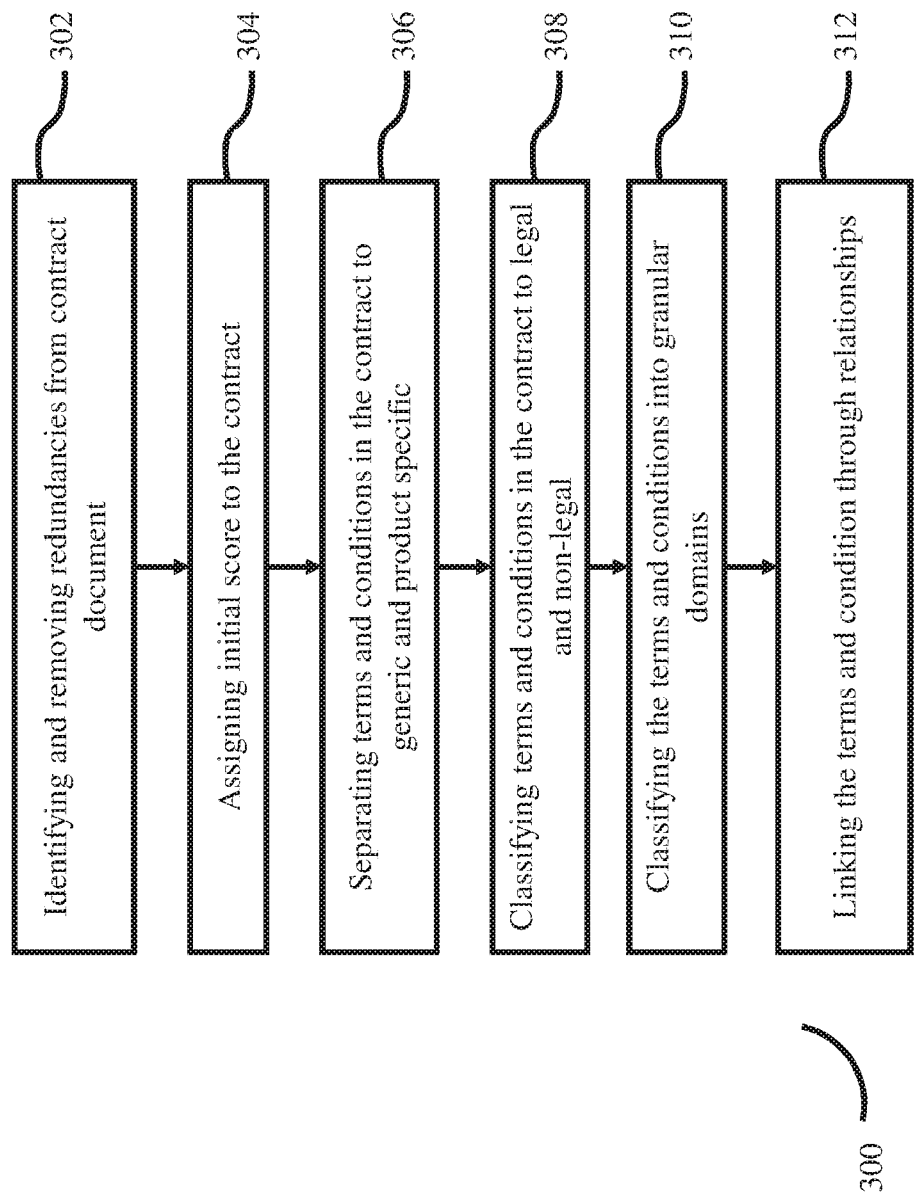
FIG. 3 is a flow diagram illustrating steps involved in the process of executing refactoring of a contract, by the contract management system, according to some embodiments of the present disclosure.

FIG. 3 is a flow diagram illustrating steps involved in the process of executing refactoring of a contract, by the contract management system, according to some embodiments of the present disclosure. The refactoring of a contract is done to generate a simplified view of a contract. The contract that is to be refactored is given as input to the refactoring module 105. The refactoring module 105 processes the contract initially to identify and remove (302) redundancies from the contract. While performing the redundancy check, the terms and conditions in the contract are modelled in the form of events, ontologies, rules, and so on and the redundancies are removed.

Post removal of redundancies, the refactoring module 105 assigns (304) an initial score to the contract, wherein the initial score is an initial complexity score. In an embodiment, the refactoring module 105 takes into account expertise of user of the refactoring module 105 (who is the person trying to perform refactoring of the document), while assigning the initial score to the contract. For instance, values '0' or '1' are used by the refactoring module 105 based on expertise of the user. The refactoring module 105 creates a binary string with values being determined as "0" or "1" based on the formula (1) listed below by way of example. Thus, complexity score of the document is decimal equivalent of the binary string. For instance, the below mentioned equation is used by the refactoring module 105 to generate the initial score.

$$\text{PosDomain}_i > \text{PosDomain}_j \text{ if } \text{Domain}_i\text{score} < \text{Domain}_j\text{score}$$
$$(\text{Domain}_{score} > \text{Threshold}) \rightarrow 1 \quad (1)$$

The refactoring module 105 further classifies (306) terms and conditions of the contract as 'generic' and 'entity specific', as per pre-configured conditions and requirements. The refactoring module 105 can be further configured to ignore a selected set of words such as but not limited to 'and', 'or', 'what', and so on while performing the classification, as such words are generic and do not require any classification. If the entire term and condition does not contain the entity specific information, then it is classified as 'Generic'. To classify the term and condition as 'Entity specific', the words of the term and condition are matched against the attributes of the listed entities on a data marketplace the contract management system 100 is associated with. In an embodiment, the refactoring module 105 uses threshold limit on matching count to classify the term and condition as entity specific, wherein the threshold limit is configured statically or dynamically.

For example, consider the condition given below:
"No business process of buyer can use Zip code, Date of Birth and Name simultaneously."

In this condition, after excluding the general terms "No", "Business process", "of", "can", "use", "and", and "simultaneously", terms that are left are "Zip code", "Date of Birth" and "Name", which can be found on many entities listed by one or more sellers. Hence, the condition is classified as 'entity specific'.

The refactoring module 105 further classifies (308) terms and conditions of the contract as 'legal' and 'non-legal', as per pre-configured conditions and requirements. In an embodiment, term(s) and condition(s) containing direct reference to some clause of law or the law itself is classified as 'Legal'. In another embodiment, frequency score of each word or cumulative score of term and condition being analyzed is matched against a threshold specified by user, and if the score is found to be matching or exceeding the threshold value, then the term and condition is classified as 'legal', otherwise as 'non-legal'.

For example, consider the below term and condition:
"According to Gramm-Leach-Bliley Act, the Account number attribute of the BankInfo data product should be used in masked form unless it is required for computation"

Figure 5A:
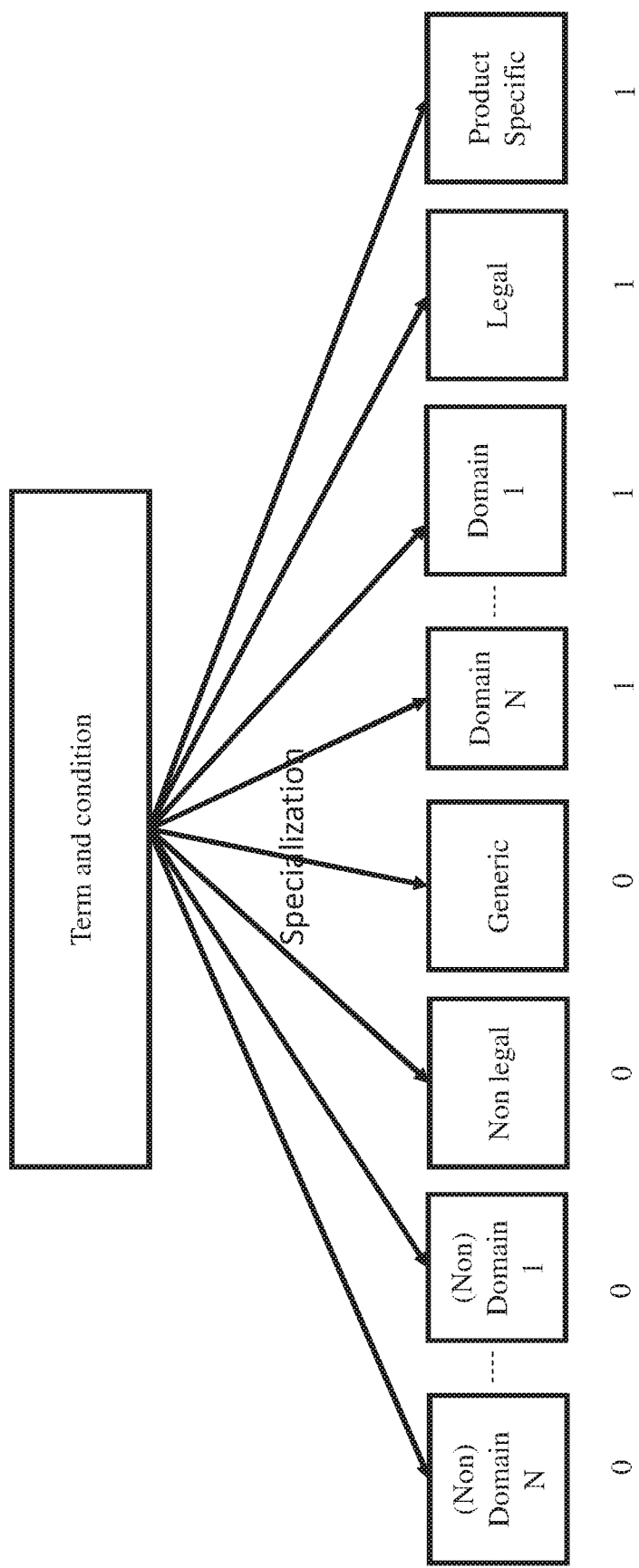
FIGS. 5a and 5b are example diagrams illustrating classification of terms and conditions and fetching of term definitions, while executing the refactoring of the contract, by the contract management system, according to some embodiments of the present disclosure.
Figure 5B:
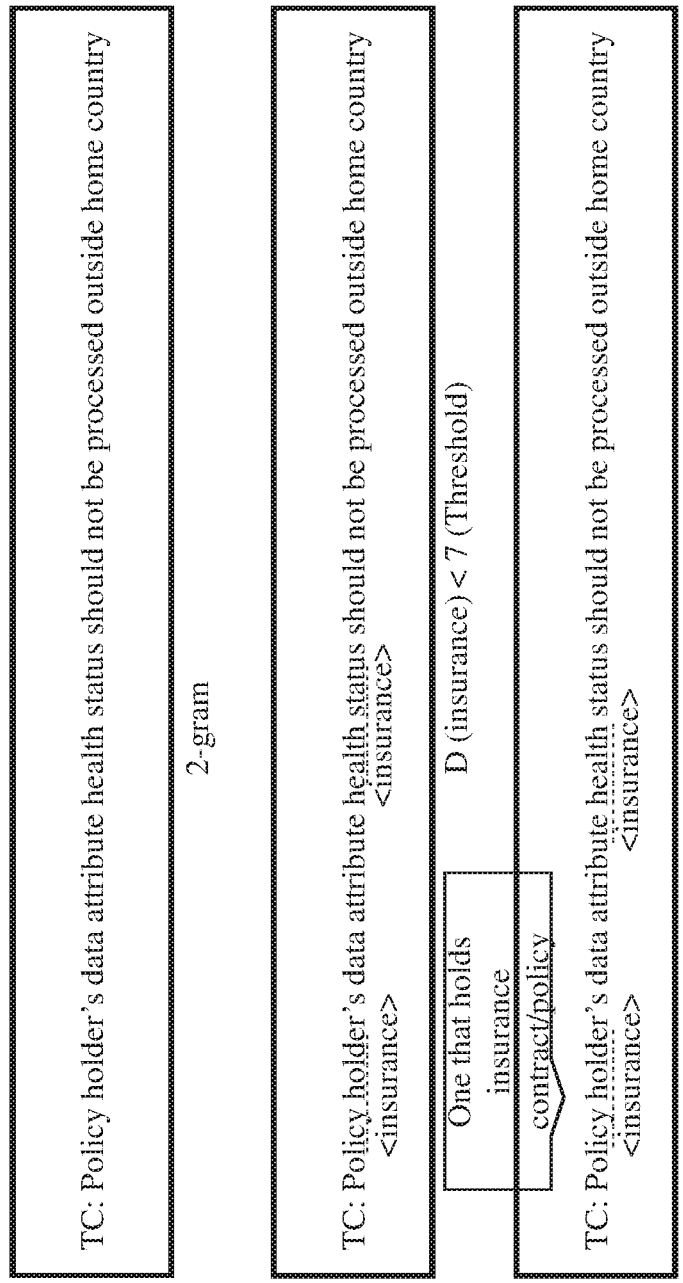

As this term and condition has direct reference to GLB Act, the refactoring module 105 classifies the term and condition as 'legal'. If the term and condition does not have any legal term, then it is classified as 'non-legal'. Classification of terms and conditions as 'legal/non-legal' and 'generic/entity-specific' for the aforementioned term and condition is depicted in FIG. 5a.

The refactoring module 105 further classifies the terms and conditions based on one or more domains, wherein the terms and conditions are related to, such as but not limited to insurance, banking, security, and healthcare. At this stage, the refactoring module 105 extracts terms and conditions from the contract, as n-grams, and for each n-gram, fetches domain scores. In an embodiment, the domain score for n-gram represents a user's expertise with respect to domain the contract is related to. If the domain score is found to be less than a threshold value of domain scores for any n-gram, then corresponding definition is fetched and attached with the n-gram, so that the user can view the definition whenever needed. Further, the refactoring module 105 links (312) the extracted terms and conditions by identifying appropriate relationships, and presents the extracted contents in a suitable format to the user. Consider FIG. 5b. In the scenario depicted in 5b, term and condition being processed is 'Policy holder's data attribute health status should not be processed outside home country'. The refactoring module 105, by processing the term and condition, identifies that the terms 'Policy holder' and 'health status' are insurance related terminologies, and extract them as n-grams. Further, for the extracted n-gram, extracted domain score is 2. The refactoring module 105 compares the extracted domain score with a threshold (which is '7' in this scenario), and as the domain score is lesser than the threshold, definition of the n-gram is fetched and linked to the term and condition, as depicted in 5b.

In an embodiment, complexity of the contract reduces as the refactoring of the contract is done. In an embodiment, the contract management system 100 assesses the reduced complexity using a complexity reduction estimation mechanism, which in turn can be executed using a complexity reduction estimator (hereinafter referred to as 'estimator'—not shown in FIGS.) that is internally or externally associated with the contract management system 100.

The estimator estimates the complexity reduction achieved as the result of the aforementioned refactoring process. Binary string to each term and condition during the refactoring process includes a sequence of 0s and 1s based on classification assigned to the term and condition. Each specialization type is assigned with a value (either 0 or 1). Generic category is assigned value 0 and Entity (which is a product in this scenario) category is assigned value 1. Similarly, Non-Legal category is assigned value 0 and Legal category is assigned value 1. For each domain assigned to the given term and condition, a value of 0 or 1 is assigned, depending on number of definitions resolved while extracting the n-grams. For example, if a term and condition contains three n-gram of banking domain and all of them are resolved by assigning definition to them, then value 1 is assigned for that domain. A threshold value of n-gram is set, that would indicate whether a user has sufficient knowledge about a domain or not. If the user is found to have sufficient knowledge, then the corresponding n-gram (s) is considered as resolved. Binary string for each term and condition has the 'Generic' or 'Product specific' category in the least significant position in the string and the domain with least expertise in the most significant position.

| Binary assignment scheme | | | |
|---|---|---|---|
| Domain N .. | Domain 1 | Legal/Non-Legal | Product/Generic |
| 1/0 | 1/0 | 1/0 | 1/0 |

The formula for assigning binary value 1 to particular domain position in the binary string is given as below by way of example:

$$(Domain_{score} > Threshold) ||$$
$$((Domain_{score} < Threshold \&\& ResolvedOomainDefs = True)$$
$$\rightarrow 1 \quad (2)$$

The formula for assigning bit position in binary string for domains is given as per Equation 1.

Based on equation 2, the term and condition is interpreted in terms of the binary string assigned to it. If the term and condition is assigned binary string "10010" then that term and condition is generic with reference to law or contains legal text. In addition to that, n-grams of that term and condition are assigned three different domains. The definition of the n-grams of domain which is least understandable to a user has got all of its definitions resolved but the definitions of two domains are not resolved fully.

Finally, the binary string is converted into decimal value and sum, and an overall score is generated by summing the decimal values for all the terms and conditions. The overall value thus generated indicates the reduction achieved in the complexity of contract document being processed. The formula to calculate the complexity reduction score for the document containing n terms and conditions is given below by way of example.

$$\sum_{i=1}^{i=n} ToDecimal(BinaryString_i) \quad (3)$$

The steps in method 300 can be performed in the same order or at least one other order, as required. Further, one or more steps in FIG. 3 can be removed as per requirements.

Figure 4A:
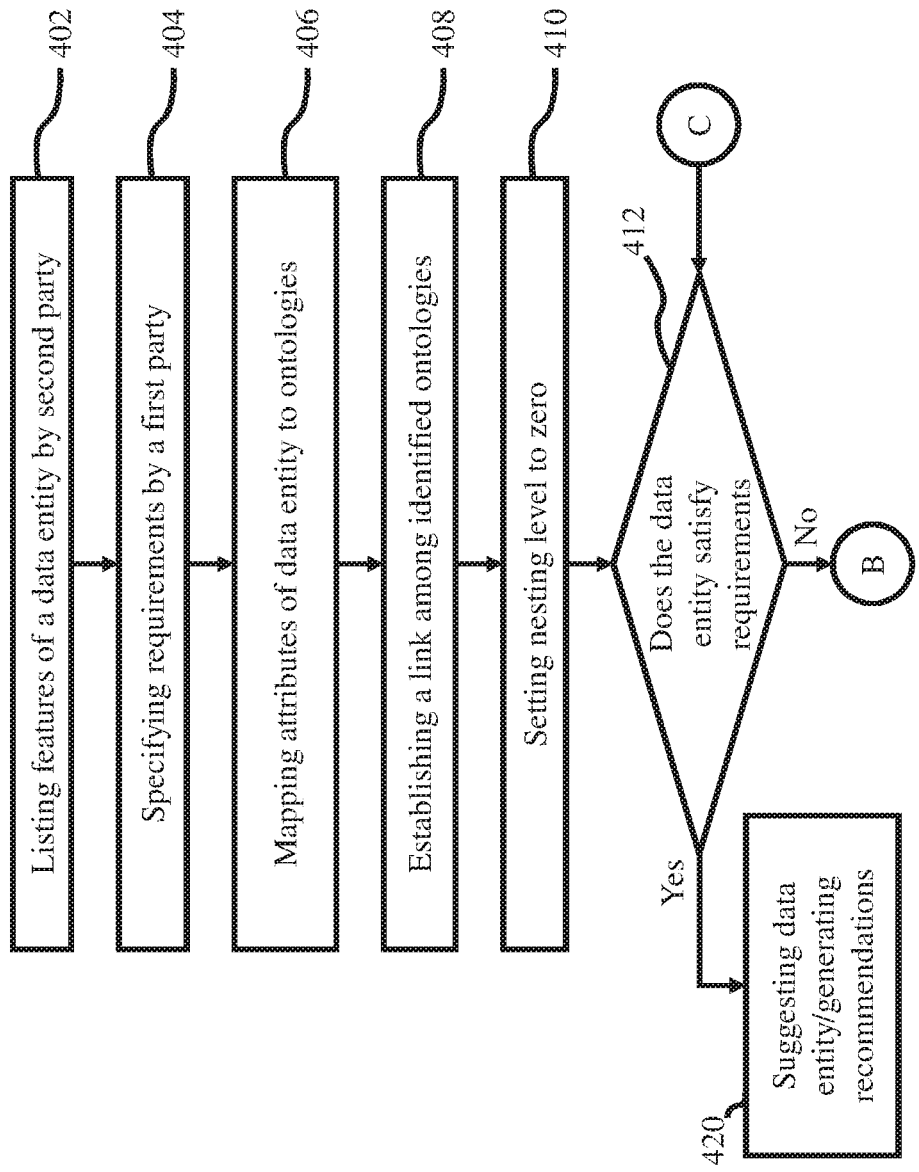
FIG. 4 is a flow diagram illustrating steps involved in the process of executing a requirement validation, by the contract management system, according to some embodiments of the present disclosure.
Figure 4B:
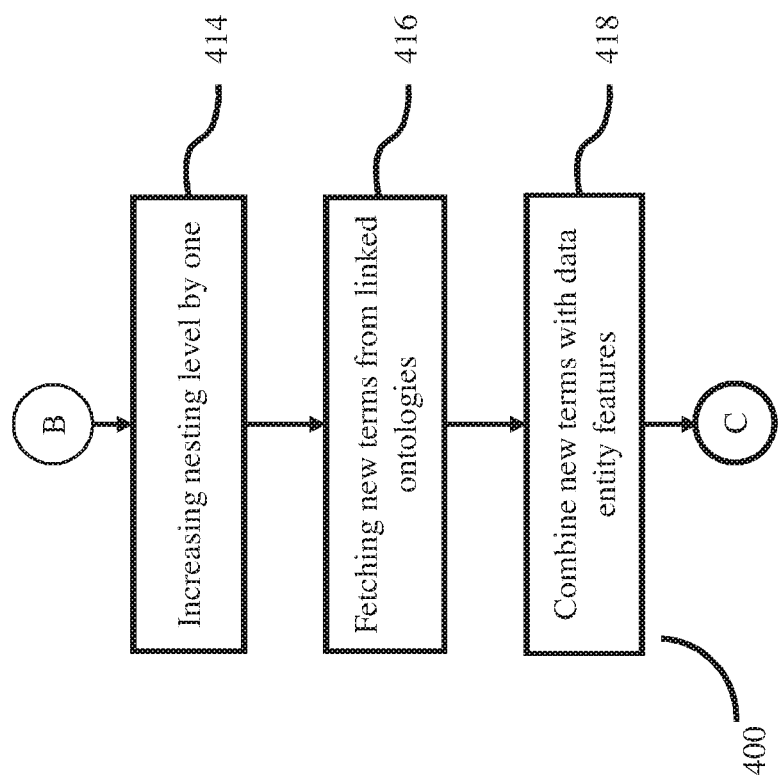

FIG. 4 is a flow diagram illustrating steps involved in the process of executing a requirement validation, by the contract management system, according to some embodiments of the present disclosure. A buyer (hereinafter referred to as 'first party'), in a data marketplace, specifies (404) requirements of a data entity (which can be a product and/or service) he/she intends to purchase, on a platform externally or internally supported by the contract management system. An example of 'requirement' is:
"I need data product containing data about:
    Name of person
    Address
    Insurance purchase history
    Disease and severity
    Payment history"

When a seller (hereinafter referred to as 'second party') of any data entity intends to sell the data entity, he/she lists out (402) features (also referred to as 'attributes') of the data entity to be sold, on the platform. Here the term 'entity' can refer to a 'product' or a 'process' or a combination thereof.

The contract management system 100, maps (406) attributes of the listed data entity to the ontologies stored in the memory module 108, and identifies one or more ontologies contents of the contract is related to. In an embodiment, contents of a contract can be associated with one or more ontologies. For example, consider that the contract is primarily in healthcare domain. However, that particular contract can have information with respect to insurance schemes, which makes contents of the contract associated with insurance domain as well. The contract management system 100, after identifying all ontologies the contract is related to, establishes (408) a link between the identified ontologies.

The contract management system 100 then sets (410) nesting level to zero, and then checks (412) whether the data entity satisfies requirements specified by the first party. If the data entity satisfies the requirements, then the data entity is recommended to the first party. This in turn helps the first party and the second party in making sure that the requirements are satisfied, before getting into an agreement i.e., a contract.

If the requirements are not met at nesting level zero, then the contract management system 100 increases (414) nesting level by one, and performs a search in next level of hierarchy of linked ontologies, which means, additional terms with respect to the linked ontologies are considered. The contract management system 100 then fetches (416) matching terms from the level of hierarchy of the linked ontologies being searched in the current nesting level. The new terms thus fetched are combined (418) with the features of the data entity. The features, along with the newly combined terms, are then compared with the requirements to verify whether the requirements are now satisfied. This process is repeated (by increasing nesting level, fetching new terms, combining with features, and comparing with requirements) till a proper match or a close match is found, which in turn is provided (420) as a suggestion to the first party. If no match is found (an exact match or match to a specified extent), recommendations are provided to the second party, wherein the recommendations specify changes to be made to the listed data entity to make it satisfy the requirements.

Arranging ontology at different levels of hierarchy in the memory module 108 and searching at different nesting levels allows the contract management system 100 identify to what extent the listed data entity varies from the requirements. For example, if the contract management system 100 is able to find a match in nesting level zero, it means features of the data entity matches the requirements or are very close to what has been specified as requirements. Increase in nesting level is proportional to extent to which features of the data entity varies/deviates from the specified requirements. The contract management system 100 then generates an agreeable requirement document that includes the recommendation(s) and/or requirement(s), which is then made accessible to the first party and the second party. The steps in method 400 can be performed in the same order or at least one other order, as required. Further, one or more steps in FIG. 4 can be removed as per requirements.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of contract management in a data marketplace. The embodiment, thus provides mechanism to perform refactoring of a contract. Moreover, the embodiments herein further provides a mechanism to generate an agreeable requirement document with suggestions and/or recommendations to a first party and a second party.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor implemented method, comprising:
   obtaining, by a contract management system, a contract comprising information from at least one of a first party and a second party;
   receiving, by the contract management system, an input specific to the contract from a user, wherein the input comprises selection of at least one of a refactoring of the contract or a requirement validation based on the contract; and
   performing based on the selection, by the contract management system, one of refactoring of the contract or requirement validation based on the contract,
   said refactoring of the contract comprises of:
      assigning an initial score for the contract, via one or more hardware processors, by the contract management system, wherein the initial score is collected as input from the user;
      classifying a plurality of terms and conditions in said contract as at least one of generic and entity-specific, via the one or more hardware processors, by the contract management system;
      classifying said plurality of terms and conditions in said contract as at least one of legal and non-legal, via the one or more hardware processors, by the contract management system;
      associating the contract with at least one domain the contract is related to, via the one or more hardware processors, by the contract management system;

establishing relationship between said plurality of terms and conditions, via the one or more hardware processors, by the contract management system; and displaying said plurality of terms and conditions along with the established relationship, via the one or more hardware processors, by the contract management system, and wherein the requirement validation based on the contract comprises of:

fetching a plurality of attributes pertaining to one or more entities specified in the contract by the second party, by a requirement validation module of the contract management system;

identifying at least two ontologies, said attributes are related to, via one or more hardware processors, by the requirement validation module;

establishing a link between said at least two ontologies, via the one or more hardware processors, by the requirement validation module;

checking whether said plurality of attributes satisfy a plurality of requirements specified by the first party, via the one or more hardware processors, by the requirement validation module;

fetching at least one new attribute from at least one of an associated ontology, if said plurality of attributes do not satisfy said plurality of requirements, via the one or more hardware processors, by the requirement validation module;

determining whether said plurality of attributes of the one or more entities, along with the fetched at least one new attribute, match said plurality of requirements, via the one or more hardware processors, by the requirement validation module; and generating an agreeable requirement document, via the one or more hardware processors, by the requirement validation module.

2. The method as claimed in claim 1, wherein said agreeable requirement document comprises of a recommendation of one or more entities to the first party, and wherein said plurality of attributes of said one or more entities satisfy said plurality of requirements specified by the first party.

3. The method as claimed in claim 1, wherein said agreeable requirement document comprises of a recommendation to the second party, and wherein said recommendation is with respect to one or more changes to be made to the one or more entities specified in the contract by the second party, to make features of said one or more entities match said plurality of requirements specified by the first party.

4. A contract management system, said system comprising:

a hardware processor; and a storage medium comprising a plurality of instructions, said plurality of instructions causing the hardware processor to:

obtain, a contract comprising information from at least one of a first party and a second party;

receive, an input specific to the contract from a user, wherein the input comprises selection of at least one of a refactoring of the contract or a requirement validation based on the contract; and perform, based on the selection, one of refactoring of the contract or requirement validation based on the contract, said refactoring of the contract comprises of:

assigning an initial score for the contract, via one or more hardware processors, by the contract management system, wherein the initial score is collected as input from the user;

classifying a plurality of terms and conditions in said contract as at least one of generic and entity-specific, via the one or more hardware processors, by the refactoring module;

classifying said plurality of terms and conditions in said contract as at least one of legal and non-legal, via the one or more hardware processors, by the refactoring module;

associating the contract with at least one domain the contract is related to, via the one or more hardware processors, by the refactoring module;

establishing relationship between said plurality of terms and conditions, via the one or more hardware processors, by the refactoring module; and displaying said plurality of terms and conditions along with the established relationship, via the one or more hardware processors, by the refactoring module, and wherein generating an agreeable requirement document from the contract comprises of:

fetching a plurality of attributes pertaining to one or more entities specified in the contract by the second party, by a requirement validation module of the contract management system;

identifying at least two ontologies, said attributes are related to, via one or more hardware processors, by the requirement validation module;

establishing link between said at least two ontologies, via the one or more hardware processors, by the requirement validation module;

checking whether said plurality of attributes satisfy a plurality of requirements specified by the first party, via the one or more hardware processors, by the requirement validation module;

fetching at least one new attribute from at least one of an associated ontology, if said plurality of attributes do not satisfy said plurality of requirements, via the one or more hardware processors, by the requirement validation module;

determining whether said plurality of attributes of the one or more entities, along with the fetched at least one new attribute, match said plurality of requirements, via the one or more hardware processors, by the requirement validation module; and generating said agreeable requirement document, via the one or more hardware processors, by the requirement validation module.

5. The requirement validation module as claimed in claim 4 is configured to generate the agreeable requirement document with recommendation of one or more entities to the first party, wherein said plurality of attributes of said one or more entities satisfy said plurality of requirements specified by the first party.

6. The requirement validation module as claimed in claim 4 is configured to generate the agreeable requirement document with a recommendation to the second party, wherein said recommendation is with respect to one or more changes to be made to the one or more entities specified in the contract by the second party, to make features of said one or more entities match said plurality of requirements specified by the first party.

7. A non-transitory computer readable medium embodying a program executable in a computing device for contract management, comprising:

a program code for obtaining a contract comprising information from at least one of a first party and a second party;

a program code for receiving an input specific to the contract from a user, wherein the input comprises selection of at least one of a refactoring of the contract or a requirement validation based on the contract; and a program code for performing, based on the selection, one of refactoring of the contract or requirement validation based on the contract, said refactoring of the contract comprises of:

assigning an initial score for the contract, via one or more hardware processors, by the contract management system, wherein the initial score is collected as input from the user;

classifying a plurality of terms and conditions in said contract as at least one of generic and entity-specific, via the one or more hardware processors, by the refactoring module;

classifying said plurality of terms and conditions in said contract as at least one of legal and non-legal, via the one or more hardware processors, by the refactoring module;

associating the contract with at least one domain the contract is related to, via the one or more hardware processors, by the refactoring module;

establishing relationship between said plurality of terms and conditions, via the one or more hardware processors, by the refactoring module; and displaying said plurality of terms and conditions along with the established relationship, via the one or more hardware processors, by the refactoring module, and wherein generating an agreeable requirement document from the contract comprises of:

fetching a plurality of attributes pertaining to one or more entities specified in the contract by the second party, by a requirement validation module of the contract management system;

identifying at least two ontologies, said attributes are related to, via one or more hardware processors, by the requirement validation module;

establishing link between said at least two ontologies, via the one or more hardware processors, by the requirement validation module;

checking whether said plurality of attributes satisfy a plurality of requirements specified by the first party, via the one or more hardware processors, by the requirement validation module;

fetching at least one new attribute from at least one of an associated ontology, if said plurality of attributes do not satisfy said plurality of requirements, via the one or more hardware processors, by the requirement validation module;

determining whether said plurality of attributes of the one or more entities, along with the fetched at least one new attribute, match said plurality of requirements, via the one or more hardware processors, by the requirement validation module; and generating said agreeable requirement document, via the one or more hardware processors, by the requirement validation module.

* * * * *